United States Patent [19]

Colla et al.

[11] Patent Number: 4,926,155
[45] Date of Patent: May 15, 1990

[54] INTEGRATED CIRCUIT SILICON PRESSURE TRANSDUCER PACKAGE

[75] Inventors: Jeannine O. Colla, Mequon; Paul E. Thomas, Wauwatosa; Donald K. Showers, Madison, all of Wis.

[73] Assignee: Johnson Service Company, Milwaukee, Wis.

[21] Appl. No.: 282,604

[22] Filed: Dec. 12, 1988

[51] Int. Cl.$^5$ ............................................. H01L 10/10
[52] U.S. Cl. ......................................... 338/36; 338/5; 338/42
[58] Field of Search .................... 338/36, 42, 2, 4, 5

[56] References Cited

U.S. PATENT DOCUMENTS

| | | | |
|---|---|---|---|
| 4,017,819 | 4/1977 | Pien | 338/36 X |
| 4,291,293 | 9/1981 | Yamada et al. | 338/4 |
| 4,523,964 | 6/1985 | Wilner et al. | 338/2 X |
| 4,528,855 | 7/1985 | Singh | 338/4 X |
| 4,596,155 | 6/1986 | Kistler | 338/5 X |
| 4,675,643 | 6/1987 | Tanner et al. | 338/4 |

Primary Examiner—Bruce A. Reynolds
Assistant Examiner—Marvin M. Lateef
Attorney, Agent, or Firm—Foley & Lardner

[57] ABSTRACT

A sensor chip subassembly for use in a transducer assembly includes a support member to which a pressure sensitive chip is elastically bonded at predetermined but spaced points to separate the chip from direct contact with the support member. The separation minimizes vibration and stress from being transmitted from the support member to the chip.

32 Claims, 1 Drawing Sheet

INTEGRATED CIRCUIT SILICON PRESSURE TRANSDUCER PACKAGE

BACKGROUND OF THE INVENTION

1. Field of the Invention

This invention relates to a transducer package for high pressure applications.

2. Description of the Prior Art

Transducers using silicon crystals to measure pressure differentials are well known. Examples may be found in U.S. Pat. No. 4,291,293 issued Sept. 22, 1981 to Yamada, et. al. and U.S. Pat. No. 4,523,964 issued Jun. 18, 1985 to Wilner, et. al. Many applications for sensor transducers are known, including accelerometers, flow measurements, temperature sensors and humidity sensors.

A potential and particularly useful transducer employs an integrated circuit silicon crystal with a micromachined diaphragm. The silicon diaphragm deflects upon the application of pressure which results in an electrical output that is proportional to the input pressure. A silicon pressure sensor enclosure that can be interfaced with most harsh media usually consists of a stainless steel housing structure and utilizes silicone fluids or gels to transfer pressure from a stainless steel protective diaphragm to the crystal.

An existing problem with such transducers is long-term drift and/or impedance of the sensor performance due to mounting the silicon crystal onto a supporting substrate. Changes in sensor characteristics are also ascribed to the high coefficients of thermal expansion of silicone fluids and gels.

The prevalent use of silicones as the pressure transfer fluid is attributed to low toxicity, general inertness and their ability to shield the vulnerable silicon crystal against external contamination. Generally, a great deal of effort is directed toward minimizing the fluid fill area between the protective diaphragm and the silicon transducer to compensate for the high coefficient of thermal expansion of the silicones.

One means of packaging sensors at the silicon pressure transducer chip level is known as electrostatic bonding which allows the silicon chip to be bonded to a glass support chip. The electrostatic bond is formed using a combination of heat and voltage. The silicon and glass are placed in contact and are heated to a temperature of, typically, 450° C. As voltage is then applied, mobile sodium ions in the glass drift toward the cathode and away from the glass-silicon interface. A large fraction of the applied voltage is dropped across this interface and the resulting electric field pulls the glass and silicon into contact. If the bonding procedure is correctly carried out, the bond strength to silicon is above the silicon fracture limit.

However, both internal and external stresses that develop during the electrostatic bonding procedure tend to evoke stresses on the pressure transducer causing long-term drift or mechanical damage. The quality of the bond is also dependent on the surface roughness of the silicon and glass materials being joined, and the atmosphere in which the processing occurs.

Glass sealing is also employed in packaging pressure transducers. An important criterion in any glass sealing application involves the thermal expansion rates of the silicon chip and the glass being joined together. For example, at high temperatures, the glass deforms by viscous flow, compensating for the thermal expansion difference of the silicon pressure transducer. However, when the glass and the silicon cool, each material shrinks along its own thermal expansion curve. Viscous deformation stops and stresses are produced at the interface between the two materials. Other factors such as the cooling rate, the annealing procedure, and the geometric design of the seal also affect the level of stress induced at the interface.

SUMMARY OF THE PRESENT INVENTION

A high pressure transducer is provided by a pressure sensitive chip, i.e., a chip with strain gauges suitably adhered to the chip which is elastically bonded to a supporting member in such a manner as to preclude long term drift due to thermal expansion differentials between the crystalline chip and the supporting member. In accordance with one embodiment of the present invention, the supporting member is provided with a pressure sensitive chip bonded to the supporting member with a preselected elastic adhesive at spaced points along the facing surface of the chip. The chip is thus spaced from the support member with only indirect contact being provided by the elastomeric adhesive. The adhesive effectively isolates the pressure sensitive chip from the support member.

In a preferred exemplary embodiment, the supporting member has a region thereof appropriately recessed to form a small cavity having an internal ledge. The pressure sensitive chip is positioned within the cavity such that the corners of the chip extend over the internal ledge within the cavity. The chip then is bonded at its corners to the ledge of the supporting member. When the pressure sensitive chip and supporting member are positioned within a transducer housing, a pressure transfer medium may be introduced which penetrates beneath the chip into the cavity and is confined additionally to a volume between a pressure transmitting diaphragm and the chip. Thus, the cavity serves the dual function of permitting the chip to be substantially surrounded by the pressure transfer medium and to ensure isolation between the chip and support member.

Electrical contact is made between the silicon chip and pins mounted in and around the periphery of the supporting member with gold or aluminum wires appropriately attached. The pins are attached to the supporting member with a non-reactive thermoplastic polymer which also serves as a sealant. A thermoplastic polymer is also used to attach and seal the supporting member and diaphragm to the transducer housing.

DETAILED DESCRIPTION OF THE DRAWING

A preferred exemplary embodiment of the present invention will hereinafter be described wherein like numerals denote like elements and:

DETAILED DESCRIPTION OF THE PREFERRED EXEMPLARY EMBODIMENT

Figure 1:
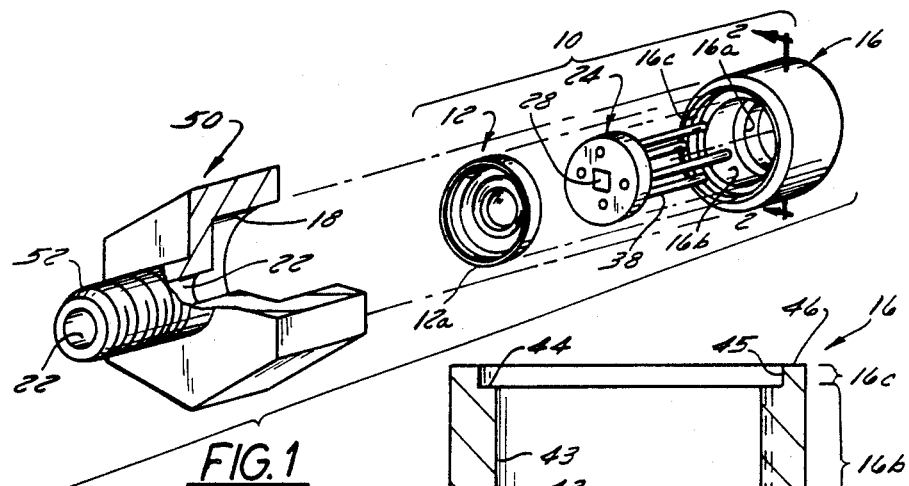
FIG. 1 is an exploded perspective view of a silicon chip diaphragm assembly in accordance with one embodiment of the present invention with a portion of the nozzle housing broken away.

Referring now to the exploded perspective of FIG. 1, a silicon pressure sensor assembly is depicted having a nozzle housing 50, and a transducer subassembly 10 comprising a diaphragm 12, a thin circular support member 24 mounting a small pressure sensitive chip 28 and stainless steel housing 16. Nozzle housing 50 which is designed to receive the entire subassembly within cavity 18 has a nozzle 52 with an opening 22 communicating with cavity 18 allowing entry of fluid whose pressure is to be measured to directly impinge against diaphragm 12. Nozzle 52 may be appropriately threaded to facilitate coupling with an apparatus containing the fluid whose pressure is to be measured.

Figure 3:
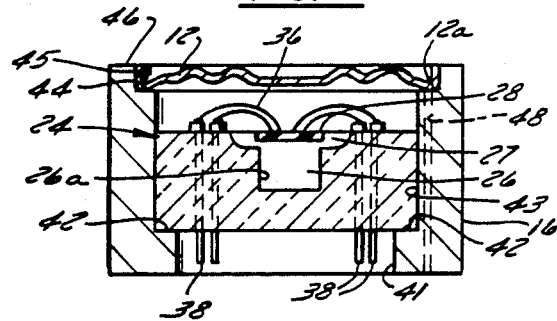
FIG. 3 is a side sectional view of the transducer housing similar to FIG. 2 except with a diaphragm and support member positioned therein.

Continuing now to FIG. 3, it may be seen that support member 24 is provided with a cavity 26 located beneath chip 28. Additionally, as seen both in FIG. 3 and the top plan view of FIG. 4, cavity 26 has an essentially cylindrical configuration with a pair of diametrically opposed lobes or troughs 27 extending out from the center thereof. Troughs 27, which are shown in FIG. 3 as being shallower than the central portion 26a of cavity 26, serve to facilitate egress of the fluid beneath chip 28. The dimensions of cavity 26 and troughs 27, however, are not to scale.

It is preferred that the total volume of cavity 26 and volume between chip 28 and diaphragm 12 be kept as small as possible to minimize total volume of the fluid pressure transfer medium. Maintaining a relatively large fluid volume may have an adverse effect on the sensing capability of the sensor due to thermally induced expansion of the fluid. In other words, the more transfer fluid that is present within the sensor, the greater the possibility of pressure errors that may be introduced into sensor measurements by the temperature ranges to which the sensor (and fluid) may be exposed.

Support member 24 is preferably fabricated from a ceramic material or materials having ceramiclike physical characteristics such as low electrical conductivity, low thermal expansion coefficients, chemically inert, resistance to extreme temperature changes, and amenability to bonding to other materials. Materials such as steatite, glass ceramic, and preferably alumina may be employed. These materials may be machinable or moldable ceramics. Machinable alumina is available from the Corning Glass Company under the tradename Macor ®. To form cavity 26 with troughs 27, the ceramic supporting surface, which may be in disc form with a diameter of about 0.430 inch, is held stationary while the center volume of cavity 26 and troughs 27 are cut by an appropriate tool such as an end mill.

Referring once more to FIG. 4, it may be seen that planar chip 28 spans cavity 26 and interfaces with support member 24 along its corners. An enlarged view of one corner 28a of chip 28, as seen in FIG. 5, depicts corner 28a as being positioned in an abutting relationship with internal ledges 30 formed in member 24. The depth of ledges 30, measured from the top surface of member 24, is approximately the thickness of chip 28 such that chip 28 and support member 24 have essentially co-planar top surfaces. This co-planar relationship is most easily viewed in FIG. 3.

To provide a chip which spans cavity 26, a wafer of, preferably, silicon material is fabricated with a square configuration with diagonals slightly larger than the cylindrical portion of cavity 26. Thus chip 28, which spans cavity 26 by virtue of its diagonals, interfaces member 24 only along the small surface area of corners 28a. The exact structure of chip 28, however, is not limited to a rectangular or square configuration. Other polygonal structures could be employed as well as long as the stability of chip 28 against support member 24 is maintained. It is preferred, however, that at least three spaced apart points on the peripheral edges of chip 28 be maintained in adhesive contact with member 24.

Reference is again made to FIG. 5 illustrating that the bonding of chip 28 to member 24 is accomplished by using a resilient adhesive denoted by numeral 32 at the spaced apart corners 28a abutting ledges 30. The resilient adhesive bonding minimizes thermal stress normally associated with integral bonding which is particularly evident when the entire surface of the chip is bonded to an underlying support member. The soft mount of adhesive 32 applied to corners 28a holds chip 28 uniformly to support member 24, but does not impart stress or vibration to the chip, thus ensuring accurate, stable and repeatable pressure measurements. While various adhesives selected from a group of silicones, urethanes, and rubbers may be used as long as the adhesive has the requisite flexibility under the expected environmental conditions and is chemically compatible with other constituent components, a particularly suitable adhesive has been found to be polydimethylsiloxane sealant RTV161, manufactured by and available from the General Electric Company.

Figure 4:
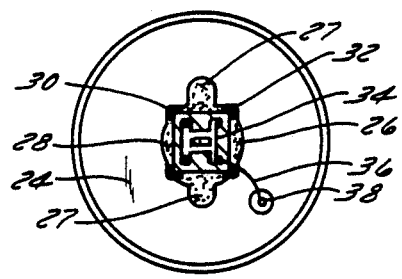
FIG. 4 is a top view of the silicon chip positioned with respect to the underlying supporting member.
Figure 5:
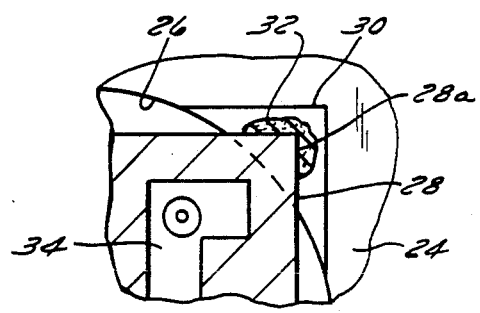
FIG. 5 is an enlarged view of one corner of the chip shown in FIG. 4 showing the elastic bonding of the corner of the chip to the underlying supporting member.

It is important to note that the use of an elastic adhesive at spaced intervals along the periphery of chip 28, such as that shown in FIG. 4, separates the chip from direct contact with underlying support member 24. Thus, only indirect contact exists between the two elements, member 24 and chip 28, through spaced apart adhesive bonds which provide significant reduction in the transfer of undesired externally induced vibration and stress. With a fluid transfer medium having the required pressure transfer characteristics, chemical compatability, and appropriate viscosity, the volume of cavity 26 may be substantially reduced since the transfer medium is able to penetrate the space between chip 28 and support member 24.

Referring to FIGS. 1 and 3, it may be seen that support member 24 is provided with a plurality of pins 38. The holes in member 24 to receive pins 38 may be formed through use of any conventional technique such as molding or mechanical or laser drilling with a sufficient diameter, e.g., 0.020 inch. Pins 38, fabricated from an electrically conductive material such as, for example, gold plated brass, are initially cleaned of contaminants by a solution of deionized water and organic solvents. To securely fix pins 38 to member 24, pins 38 may be coated with a solvent solution consisting of polysulfone dissolved in cyclopentanone, for example. The pins 38 then are positioned within the holes of member 24 where bonding therebetween occurs when member 24 is subjected to temperatures of about 260° C. for a period of about 30 minutes. Alternatively, however, pins 38 may be secured to support member 24 either by the heads thereof or by bonding a gold-plated lead ring (not shown) on the bottom of member 24 and soldering or brazing the pins to the ring. The pins 38 are then electrically connected to the piezo-resistive type strain gauge elements 34, properly oriented with respect to the crystalline axis of chip 28, by wires 36.

The correct operation of pressure sensitive chip 28 depends upon contact between the chip and the medium being measured, i.e., the "monitored medium". However, direct contact between the monitored medium and chip 28 may result in deterioration of the sensing performance of the sensor due to chemical incompatibility and the like. Therefore, when the monitored medium is chemically incompatible with chip 28, it is desirable to isolate chip 28 from such direct contact, yet maintain excellent sensitivity to pressure variations occurring in the monitored medium. This has been accomplished by the proper packaging of diaphragm 12 and chip 28 within a particularly useful housing 16 as illustrated in FIG. 3. In this packaging arrangement, diaphragm 12 is employed as a flexible separating element, exposed via its top surface to the monitored medium and via its lower surface to a pressure transmitting medium. The pressure transmitting medium which fills both the void defined between diaphragm 12 and chip 28 and cavity 26 is chemically inert with respect to chip 28 and responsive to the pressure variations exerted on diaphragm 12 for transmitting pressure.

In addition to the need to isolate chip 28 and its sensing elements from the monitored medium, it is necessary that the subassembly 10 comprising housing 16, diaphragm 12, and support member 24 with chip 28 mounted thereon has sufficient integrity to withstand the rigors of the environment to which the sensor may be subjected. Thus, appropriate bonding and sealing among the various subassembly components are required. To describe how the subassembly meets the aforementioned requirements, reference is first made to FIG. 2 which depicts housing 16 as an annular cylinder with three annular sections 16a, 16b, and 16c of respectively increasing diameters. Annular section 16a comprises an annular wall 41 and a radially directed wall 42. Similarly, section 16b has an annular wall 43 and a radially directed wall 44 while section 16c consists of annular wall 45 and rim 46. Housing 16 is preferably machined from a stainless steel cylinder.

As shown in FIG. 3, support member 24 with chip 28 mounted thereon fits snugly within wall 43 of housing 16 and sits against radially directed wall 42. Diaphragm 12, which may be fabricated from a thin sheet of 17-7 precipitation hardened stainless steel approximately 0.0031 inch thick, is shown positioned against wall 45 with rim 12a extending upward and abutting radial wall 44, thus providing the desired spaced-apart relationship with chip 28.

To provide proper adherence and tight seals between the various interfacing surfaces of the subassembly, it is desirable to use a bonding agent such as a thermoplastic which promotes the desirable bonding yet resists chemical attack by either the monitored medium or pressure transfer medium at the expected temperature ranges. A preferred bonding agent is exemplified by Bakelite Polysulfone manufactured by and commercially available from Union Carbide. Polysulfone, which is a polymer formed by linking phenylene with connecting groups of isopropylidene, ether and sulfone, is strongly heat-resistant and is preferred to acrylic adhesives which have a limited temperature range. Additionally, none of the chemical groups are damaging to the silicon pressure sensor. Polysulfone is stable to over 800° F. with a flow point for die injection applications of approximately 700° F.

To accomplish the proper bonding of support member 24 to housing 16, a bonding agent is first placed into a solution which, for example, may be approximately 20 percent by weight of polysulfone and 80 percent by weight cyclopentanone. The solution is then applied to the portion of the interfacing surfaces of the ceramic member 24 and housing 16 which are to be bonded. The member 24 is press-fitted into housing 16 which then is air dried for approximately 16 hours to remove the solvent. Housing 16 with member 24 is then subjected to heat treatment at about 260° C. for approximately 30 minutes, causing the polysulfone polymer to fuse and bond ceramic support member 24 to the stainless steel housing 16.

Alternately, other materials may be employed to provide proper bonding between components. For example, it may be desirable to employ a hexafluoropropylene-tetrafluoroethylene copolymer, available from du Pont under the tradename Teflon FEP for bonding at higher temperatures. Precut sections of the copolymer, about 0.005 inch thick, are inserted between substrate 24 and housing 16 and subjected to a heat treatment at about 482° C. for a period of 30 minutes. The copolymer thus melts and flows, forming a film intimately contacting and sealing the parts upon cooling.

While various techniques for bonding diaphragm 12 to housing 16 may be used, such as welding via a laser, soldering and brazing, it is preferred to obtain bonding by coating the various interfacing surfaces, as described above, with a thermoplastic bonding agent such as the aforementioned polysulfone solution compound which, under elevated temperature, fuses to the interface surface. Thus, initially the interfacing surfaces of housing 16, walls 44 and 45, and rim 12a of diaphragm 12 are coated with a bonding agent such as polysulfone dissolved in cyclopentanone. The coated parts are then heat-treated at about 260° C. for approximately 30 minutes to fuse the bonding agent, in this case polysulfone, to the coated surfaces. Following placement of pressure sensitive chip 28 on supporting member 24 within housing 16 and establishing the electrical contacts between the sensing elements and pins, diaphragm 12 is placed into position within housing 16. All of the components are then coated with an additional solvent bonding agent, such as polysulfone dissolved in cyclopentanone, and diaphragm 12 is then press-fitted into place. The entire assembly is then air dried for about 16 hours and thereafter baked at a sufficient temperature to cause removal of all traces of solvent from the bonding interface between diaphragm 12 and housing 16. The reapplication of the bonding agent also assures complete coverage of any asperities in the mating components. The resulting thermoplastic bonding between components provides an effective seal at very modest cost.

Figure 2:
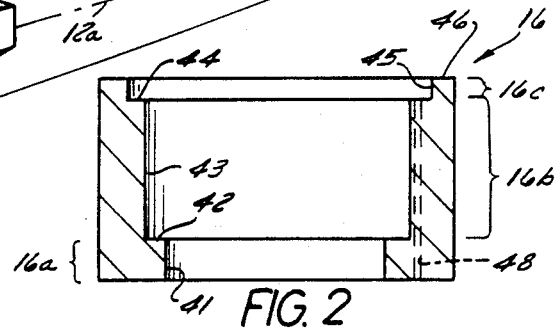
FIG. 2 is a side sectional view of the transducer housing employed in the assembly of FIG. 1 taken along line 2—2.

Once the diaphragm 12 and support member 24 have been appropriately bonded and sealed, as described above, the pressure transfer medium in the form of a fluid or gel may be forced through channel 48, shown by dashed lines in FIGS. 2 and 3, into the open volume within housing 16, which includes cavity 26 and the void between support member 24 and diaphragm 12. Channel 48 thereafter may be sealed with an appropriate potting compound or by the controlled deformation of a small steel ball forced into channel 48. The steel ball, made of a softer steel composition than housing 16, permits deformation thereof as the balls are urged into channel 48.

Various silicone fluids and gels may be employed for the pressure transfer medium, but it has been determined that certain shortcomings, such as a high degree of thermal expansion, may be avoided or minimized by the selection of other fluids. It is desirable that the coefficient of volume expansion of any fluid used as the pressure transfer medium be less than about $$.0012 \frac{cm^3}{cm^3 \cdot °C}.$$

The preferred fluid is an alcohol known as 1, 3- propanediol or trimethylene glycol, which has a coefficient of volume expansion of $$.00061 \frac{cm^3}{cm^3 \cdot °C}.$$

between 20° C. and 40° C., approximately one-half the coefficient of volume expansion of silicone fluids. Additionally, trimethylene glycol has a high boiling point and low freezing point relative to other alcohols and offers a non-corrosive environment in the silicon pressure transducer.

It will be understood that the foregoing description is of a preferred exemplary embodiment of the present invention and that the invention is not limited to the specific forms shown. Modifications may be made in design and arrangement thereof within the scope of the present invention, as expressed in the appended claims.

We claim:

1. A sensor chip subassembly for use in a transducer assembly comprising:
   (a) a support member;
   (b) a pressure sensitive chip; and
   (c) means for elastically bonding said chip at spaced predetermined points along a surface of said chip to said member so as to separate said chip from direct contact with said support member thereby reducing stress induced and vibration transmitted by said support member.

2. The subassembly of claim 1 in which said elastic bonding means is an elastomeric adhesive selected from the group consisting of silicones, urethanes and rubbers.

3. The subassembly of claim 2 in which said bonding means is polydimethylsiloxane.

4. The subassembly of claim 1 in which said supporting member is a material selected from the group consisting of steatite, glass ceramic and alumina.

5. The subassembly of claim 3 in which said supporting member is comprised of alumina.

6. The subassembly of claim 1 in which said support member has a cavity therein and said chip spans a portion of said cavity.

7. The subassembly of claim 6 in which said support member and said chip have co-planar surfaces.

8. A pressure sensitive chip transducer assembly comprising:
   (a) a housing having an opening therein;
   (b) a supporting member fixedly secured to said housing within said opening;
   (c) a pressure sensitive chip; and
   (d) means for elastically bonding said chip to said chip supporting member at said spaced points on a surface of said chip thereby separating said chip surface from direct contact with said support member and reducing stress induced and vibration transmitted by said support member.

9. The assembly according to claim 8 in which said housing is comprised of plurality annular integral sections of different diameters.

10. The assembly according to claim 9 in which said support member has a cavity therein and said chip spans a portion of said cavity.

11. The assembly according to claim 10 in which said member is positioned within a first annular section of said housing and a diaphragm spaced apart from said substrate is positioned within a second annular section defining a volume therebetween which communicates with said cavity.

12. The assembly according to claim 11 in which said housing has a port extending from one exterior surface of said housing to said volume.

13. The assembly according to claim 11 in which an organic liquid fills said volume and cavity.

14. The assembly according to claim 13 in which said organic liquid has a thermal coefficient of volume expansion less than about 0.0012 cm$^3$/cm$^{3°}$ C.

15. The assembly of claim 14 in which said organic liquid is a polyhydroxyl selected from a group consisting of diols, triols and mixtures thereof.

16. The assembly of claim 15 in which said organic liquid is 1, 3- propanediol.

17. The assembly according to claim 8 in which said elastically bonding means is an elastomeric adhesive selected from the group consisting of silicones, urethanes, and rubbers.

18. The assembly according to claim 17 in which said elastomeric adhesive is polydimethylsiloxane.

19. The assembly according to claim 18 in which said substrate is alumina.

20. The assembly according to claim 10 in which said cavity has a cylindrical portion with said chip being rectangular with diagonals larger than the diameter of said reservoir cavity.

21. The assembly according to claim 20 wherein said cavity has a pair of lobe portions positioned essentially on the opposite side of said cylindrical portion.

22. A method for fabricating a transducer subassembly comprising the steps of:
   (a) forming a pressure sensitive chip;
   (b) providing a support member;
   (c) applying an elastomeric adhesive at spaced locations on one surface of said chip; and
   (d) juxtaposing said surface of said chip to said support member such that said elastomeric adhesive adheres to said member and maintains a space between said member and said surface.

23. The method of claim 22 in which said support member has a portion relieved therefrom to form a cavity within said member, said pressure sensitive chip being formed such that said surface has a width and length which span said cavity when said surface is juxtaposed to said member.

24. The method of claim 23 in which the majority of said surface is juxtaposed over said cavity.

25. The method of claim 21 in which said elastomeric adhesive is selected from a group consisting of silicones, urethanes, and rubbers.

26. The method of claim 25 in which said elastomeric adhesive is polydimethylsiloxane.

27. A pressure sensitive transducer assembly comprising:
   (a) a housing;

(b) a diaphragm mounted across an opening in said housing;

(c) a support member mounted within said housing and spaced from said diaphragm, said housing, diaphragm, and support member together defining an enclosed volume within said housing;

(d) a pressure sensitive chip elastically bonded to and separated from said support member at spaced points on a surface of said chip such that said chip is spaced from said support member; and (e) a liquid transmitting medium filling said enclosed volume for transmitting movement of said diaphragm under external pressure to said chip.

28. The assembly according to claim 27 in which said support member has a cavity and said chip spans said cavity.

29. The assembly according to claim 28 in which said cavity is formed with a substantially cylindrical portion with one or more lobes extending out therefrom, said chip spanning said portion.

30. The assembly according to claim 28 in which said chip and said support member have essentially co-planar top surfaces.

31. The assembly according to claim 27 in which said chip is bonded to said support with an elastomeric adhesive selected from a group consisting of silicones, urethanes and rubbers.

32. The assembly according to claim 27 in which said supporting member is selected from a group consisting of steatite, glass, ceramic and alumina.

* * * * *

UNITED STATES PATENT AND TRADEMARK OFFICE
CERTIFICATE OF CORRECTION

PATENT NO. : 4,926,155

DATED : May 15, 1990

INVENTOR(S) : Jeannine O. Colla et al

It is certified that error appears in the above-identified patent and that said Letters Patent is hereby corrected as shown below:

ON THE TITLE PAGE:

[75] Inventors "Paul E. Thomas," should read
--Paul E. Thoma--.

Signed and Sealed this

Twenty-seventh Day of August, 1991

Attest:

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,926,155
DATED : May 15, 1990
INVENTOR(S) : Jeannine O. Colla, Paul E. Thoma, Donald K. Showers It is certified that error appears in the above-identified patent and that said Letters Patent is hereby corrected as shown below:

On the title page;

Inventors: Paul E. Thomas should be -- PAUL E. THOMA --.

Signed and Sealed this

Eleventh Day of February, 1992

Attest:

HARRY F. MANBECK, JR.

Attesting Officer

Commissioner of Patents and Trademarks